United States Patent
Park

(10) Patent No.: US 9,568,754 B2
(45) Date of Patent: Feb. 14, 2017

(54) LIQUID CRYSTAL DISPLAY SEPARATOR

(71) Applicant: LG Display Co., Ltd., Seoul (KR)

(72) Inventor: Sung-Man Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/973,425

(22) Filed: Dec. 17, 2015

(65) Prior Publication Data

US 2016/0377894 A1    Dec. 29, 2016

(30) Foreign Application Priority Data

Jun. 26, 2015 (KR) .................. 10-2015-0091107

(51) Int. Cl.
*G02F 1/13* (2006.01)
*G02F 1/1333* (2006.01)

(52) U.S. Cl.
CPC .......... *G02F 1/1303* (2013.01); *G02F 1/1309* (2013.01); *G02F 1/133308* (2013.01); *G02F 2001/133331* (2013.01)

(58) Field of Classification Search
CPC  G02F 1/1303; G02F 1/1309; G02F 1/133308; G02F 2001/133331; G02F 1/133325
See application file for complete search history.

(56) References Cited

U.S. PATENT DOCUMENTS

| | | | | |
|---|---|---|---|---|
| 8,141,611 B2* | 3/2012 | Lai | ........................ | B23D 49/02 156/701 |
| 2011/0174445 A1* | 7/2011 | Ciliberti | ............ | H01L 21/67132 156/752 |
| 2012/0138237 A1* | 6/2012 | Hirano | .................. | G02F 1/1303 156/701 |
| 2014/0196854 A1* | 7/2014 | Lee | ...................... | B32B 43/006 156/752 |

* cited by examiner

*Primary Examiner* — Anne Hines
*Assistant Examiner* — Jose M Diaz
(74) *Attorney, Agent, or Firm* — Fenwick & West LLP

(57) ABSTRACT

A liquid crystal display separator, in which a liquid crystal display includes a liquid crystal panel and a cover glass bonded to each other by means of a resin material disposed therebetween, is disclosed. The separator includes a body unit, which is provided with a first transfer unit, positioned at a higher level, and a second transfer unit, positioned at a lower level, and which moves horizontally, a first suction unit coupled to the first transfer unit to suck a circuit board of the liquid crystal panel using a vacuum, a second suction unit coupled to the second transfer unit to suck the cover glass using a vacuum, and a separation unit for separating the liquid crystal panel and the cover glass from each other while the first or second suction unit moves horizontally on the body unit.

14 Claims, 8 Drawing Sheets

LIQUID CRYSTAL DISPLAY SEPARATOR

CROSS-REFERENCE TO RELATED APPLICATION

This application claims the benefit of Republic of Korea Patent Application No. 10-2015-0091107, filed on Jun. 26, 2015, which is hereby incorporated by reference as if fully set forth herein.

BACKGROUND OF THE INVENTION

Field of the Invention

The present invention relates to a liquid crystal display separator, and more particularly to a liquid crystal display separator capable of separating a liquid crystal panel from a cover glass of a liquid crystal display bonded to the liquid crystal panel.

Discussion of the Related Art

In recent years, with the advent of the information age, the field of displays for visually expressing electrical information signals has rapidly developed. As such, a variety of flat display devices, having superior properties such as slimness, lightness and low power consumption, have been developed as replacements for existing cathode ray tubes (CRTs).

Representative examples of such flat display devices may include liquid crystal display (LCD) devices, field emission display (FED) devices, and the like. Such flat display devices necessarily include a flat display panel to render an image. The flat display panel has a structure having two transparent insulating substrates facing each other joined such that a layer made of a material having inherent light-emitting properties or polarization properties is interposed between the substrates.

Among these, the liquid crystal display device displays images by controlling the light transmissibility of liquid crystals using an electrical field. To this end, the liquid crystal display device includes a liquid panel containing liquid crystal cells, a backlight unit for emitting light to the liquid crystal panel, and a driving circuit for driving the liquid crystal cells.

The liquid crystal panel has a plurality of gate lines and a plurality of data lines that intersect with each other to define a plurality of unit pixel regions. Such a liquid crystal panel includes a thin film transistor array substrate and a color filter array substrate facing each other, spacers disposed between both the substrates to maintain cell gaps therebetween, and liquid crystal charged in the cell gaps.

The thin film transistor array substrate includes gate lines and data lines, thin film transistors, composed of switch elements, at intersections between the gate lines and the data lines, pixel electrodes formed as liquid cell units and coupled to the thin film transistors, and an oriented film applied to the above elements. The gate lines and the data lines receive signals from driving circuits through respective pad portions. The thin film transistors supply voltage signals, supplied to the data lines, to the pixel electrodes, in response to scan signals supplied to the gate lines.

The color filter array substrate includes color filters formed as liquid cell units, a black matrix for providing boundaries between the color filters and for blocking incident external light, common electrodes for supplying a reference voltage to the liquid crystal cells in common, and an oriented film applied to the above elements.

The thin film transistor substrates and the color filter array substrates, which have been separately prepared, are arranged and joined to face each other. Liquid crystal is injected between the thin film transistor substrates and the color filter array substrates, and then sealed. Such a liquid crystal panel is attached to a reinforced cover glass so as to be used as a liquid crystal display device.

However, as such liquid crystal display devices are developed to have a high definition and a medium or large size, various defects are generated in their fabrication processes. Once defective display devices are identified, it is difficult to separate liquid crystal panels and cover glasses of the liquid crystal display devices for reuse. Furthermore, it is difficult to maintain cell gaps during the separation procedure, causing blots and the like to appear as defects in refurbished liquid crystal display. Most of the separation process is performed manually, and further defects can be generated depending on individual workers' skills.

SUMMARY OF THE INVENTION

Embodiments relate to a liquid crystal display separator including a first transfer unit, a second transfer unit, a first suction unit, a second suction unit and a separation unit. The first transfer unit moves along a first plane. The second transfer unit moves along a second plane parallel to the first plane and in a direction perpendicular to the first plane. The first suction unit is connected to the first transfer unit and attaches to a circuit board of a liquid crystal panel of a liquid crystal display. The second suction unit is connected to the second transfer unit and attaches to a cover glass of the liquid crystal display. The separation unit separates the liquid crystal panel from the cover glass by passing at least a first wire between the liquid crystal panel and the cover glass when the first transfer unit moves along the first plane and the second transfer unit moves along the second plane.

In one embodiment, the first suction unit includes a plurality of vacuum tubes at a side of the suction unit and configured to attach to the circuit board, and at least one guide pin projecting from side surface of the first suction unit and configured to insert into at least one guide hole formed in the circuit board.

In one embodiment, the separation unit includes first tensioners. Each of the first tensioners is attached to at an end of the first wire to control tensile force in the first wire.

In one embodiment, the separation unit further includes a second wire and second tensioners. The second wire extends across a path of the liquid crystal display moving in the liquid crystal display. The second wire is spaced apart from the first wire and located for insertion between the liquid crystal panel and the cover glass of the liquid crystal display. Each of the second tensioners attached to an end of the second wire to control tensile force of the second wire.

In one embodiment, the first wire has a first diameter and the second wire has a second diameter smaller than the first diameter.

In one embodiment, one of the first suction unit and the second suction unit includes a wire guide member at an edge to prevent the first and second wires from leaving the interior of the liquid crystal display through the edge.

In one embodiment, the second suction unit includes a guide member provided at a side to synchronize rotation of the second suction unit with rotation of the first suction unit.

In one embodiment, a controller controls operation of the first and second transfer units and the first and second suction units.

In one embodiment, the controller controls the second suction unit to rotate in a third plane between the first plane and the second plane by a predetermined angle to cause the first wire to enter between the liquid crystal panel and the cover glass display at an edge of the liquid crystal display.

In one embodiment, the controller controls the second suction unit to be raised by a predetermined height to cause the first wire to come into contact with an upper surface of the cover glass when the first wire is positioned over the cover glass.

In one embodiment, the liquid crystal display separator further includes manual units disposed at both sides for connecting to a wire. The manual units are movable manually to separate the liquid crystal panel from the cover glass.

In one embodiment, the second suction unit includes a heater to heat the liquid crystal display mounted on the second suction unit.

In one embodiment, the circuit board is attached to the first suction unit by vacuum suction, and the cover glass is attached to the second suction unit by vacuum suction.

In one embodiment, the first plane is a horizontal plane.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
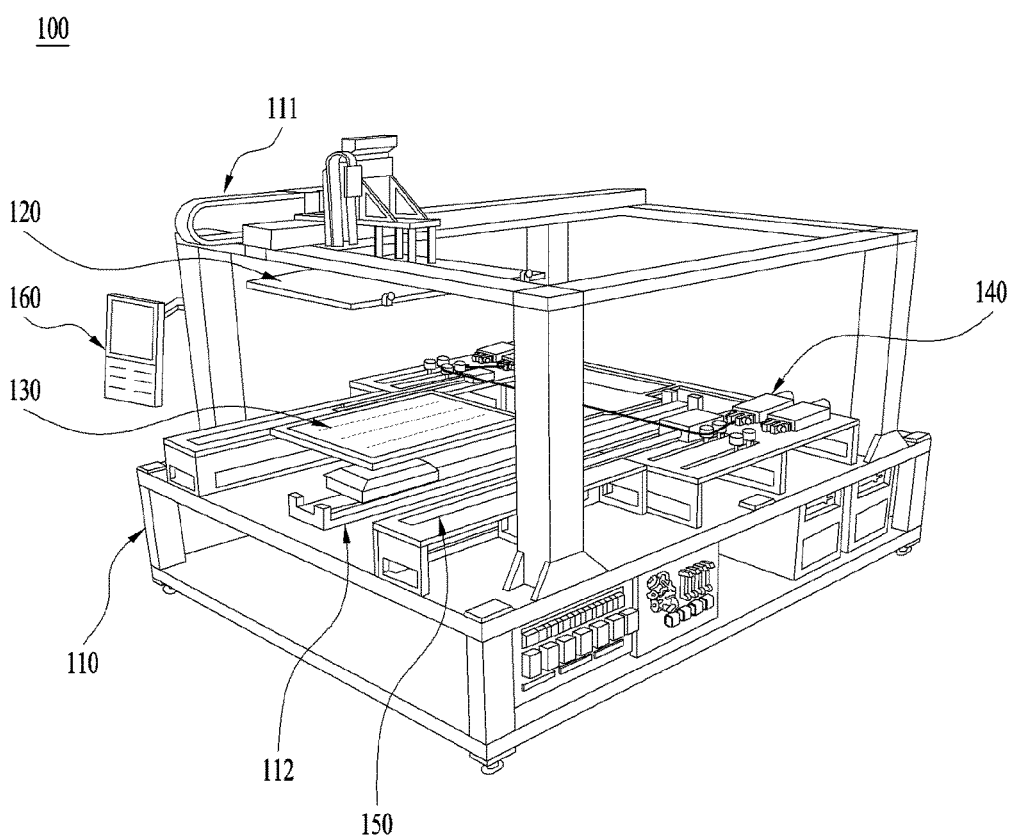
FIG. 1 is a perspective view showing a liquid crystal display separator according to an embodiment of the present invention.

Hereinafter, preferred embodiments of the present invention will be described with reference to the attached drawings so as to enable the embodiments to be easily understood by one of ordinary skill in the art to which this invention belongs. In the drawings, the same or similar elements are denoted by the same reference numerals even though they are depicted in different drawings. It is to be noted that the same reference numerals will be used throughout the drawings and the description to refer to the same or like parts. In the following description, a detailed description of known functions and configurations incorporated herein will be omitted when it may make the subject matter of the disclosure unclear. Those skilled in the art will appreciate that some features in the drawings are exaggerated, reduced, or simplified for ease in description, and drawings and elements thereof are not always shown at the proper scale.

FIG. 1 is a perspective view showing a liquid crystal display separator 100 according to an embodiment of the present invention. Referring to FIG. 1, the liquid crystal separator 100 includes a body unit 110 with a first transfer unit 111, positioned at a higher level, and a second transfer unit 112, positioned at a lower level, a first suction unit 120 coupled to the lower surface of the first transfer unit 111 of the body unit 110, a second suction unit 130 coupled to the upper surface of the second transfer unit 112 of the body unit 110, a separation unit 140, and a controller 160 for controlling the operation of the body unit 110, the first suction unit 120, the second suction unit 130 and the separation unit 140. Although not shown in FIG. 1, the liquid crystal display separator 100 may include a transparent cover or door that is selectively opened or closed to protect workers from the operation of components inside the body unit 110.

The liquid crystal display separator 100 operates to separate a liquid crystal panel 11 and a cover glass 12 forming the liquid crystal display 10 by heating the liquid crystal display 10 while sucking the liquid crystal panel 11 from above and the cover glass 12 from below. For this purpose, the second suction unit includes a heater (not shown). The separated liquid crystal panel 11 or the cover glass 12 can be reused to manufacture a non-defective liquid crystal device.

Hereinafter, the construction of the liquid crystal device 10, the structure for separating the liquid crystal display 10, and the structure of the liquid crystal display separator 100 will be described in detail.

Figure 2A:
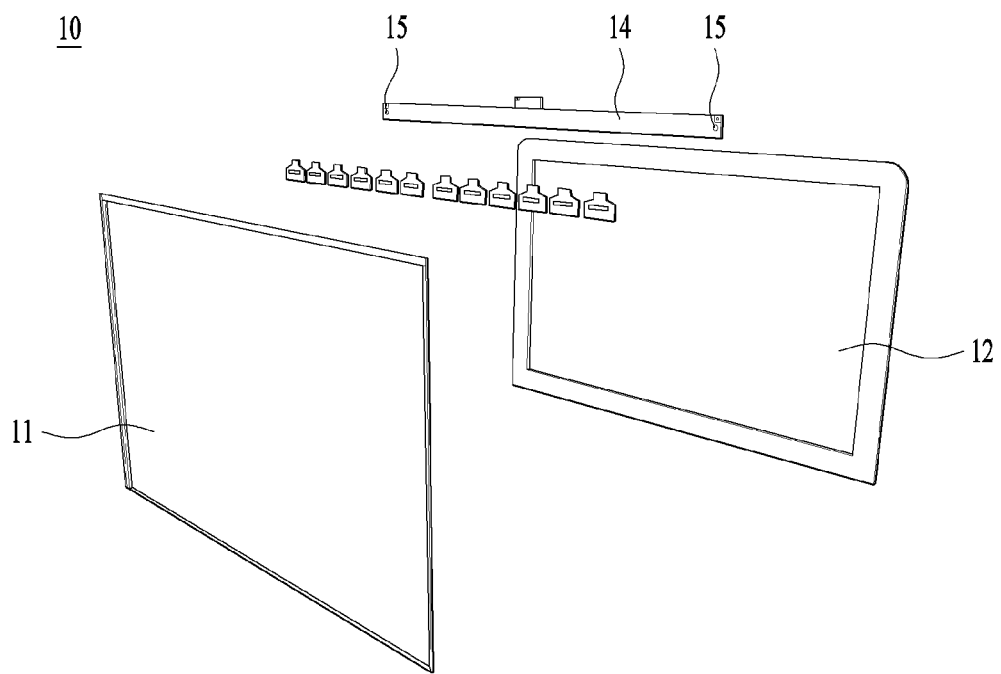
FIG. 2A is an exploded perspective view showing the construction of a liquid crystal display for separation by the liquid crystal display separator shown in FIG. 1.
Figure 2B:
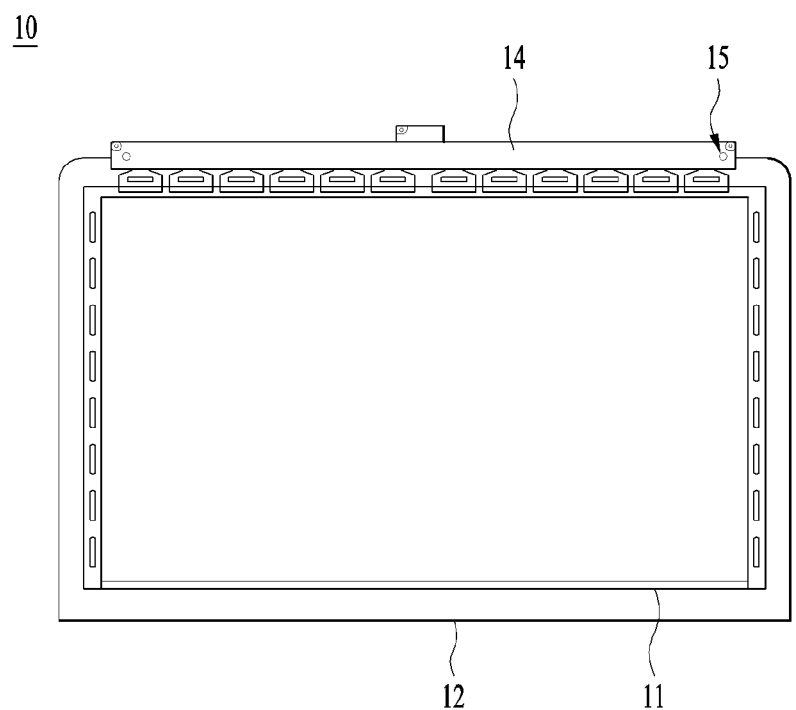
FIG. 2B is a front view showing the assembled state of the liquid crystal display shown in FIG. 2A.

FIG. 2A is an exploded perspective view showing the construction of the liquid crystal display to be separated by the liquid crystal display separator 100 shown in FIG. 1. FIG. 2B is a front view showing the assembled state of the liquid crystal display shown in FIG. 2A. Referring to FIGS. 2A and 2B, the liquid crystal display 10 includes the liquid crystal panel 11, the cover glass 12, and a circuit board 14.

The liquid crystal panel 11 and the cover glass 12 are bonded to each other by means of a resin material 13, which is disposed therebetween and made of a medium similar to the liquid crystal panel 11 and the cover glass 12.

The resin material 13 is made of a similar medium in order to prevent the generation of multiple focuses due to the refraction of light, and is preferably made of an optical clear resin (OCR) direct bonding material. Because the resin 13 can have an index of refraction that is equal to or similar to that of the cover glass 12, it is possible to reduce the scattering of light and thereby improve brightness and contrast.

The circuit board 14 is coupled to liquid crystal display 10 such that it partially protrudes from the side edge of the liquid crystal display 10, and is preferably constituted by a flexible printed circuit board (FPCB).

The liquid crystal display 10 is mounted on the liquid crystal display separator 100 in the state in which the liquid crystal panel 11 is disposed above the cover glass 12. At this point, the liquid crystal panel 11 is mounted in such a manner that the circuit board 14, coupled to a side edge of the liquid crystal panel 11, is sucked without contact with other components or suction by external suction force. Meanwhile, the underlying cover glass 12 vacuum sucked.

Figure 3A:
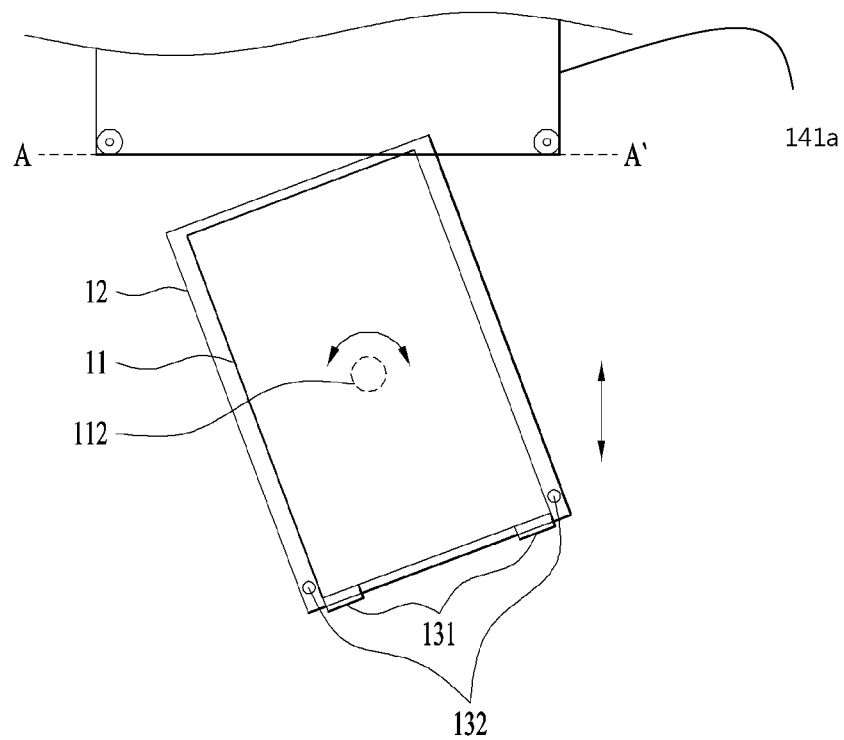
FIG. 3A is a schematic view showing the liquid crystal display shown in FIG. 2B, immediately before the liquid crystal display is separated by a separation unit.
Figure 3B:
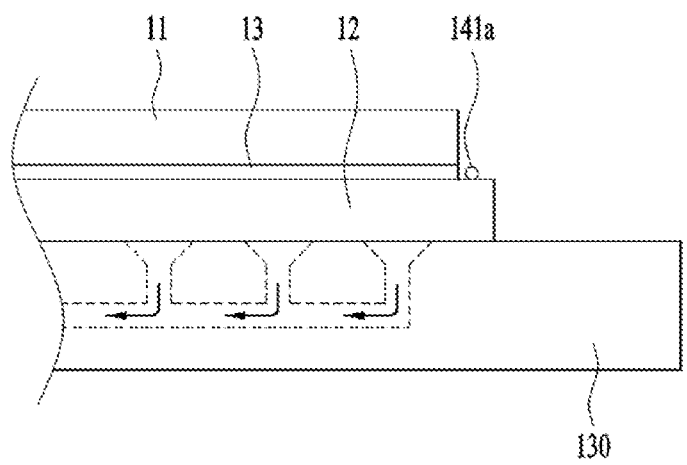
FIG. 3B is a cross-sectional view taken along line A-A' of FIG. 3A.

FIG. 3A is a schematic view showing the liquid crystal display 10 of FIG. 2B before it is separated from the separation unit. FIG. 3B is a cross-sectional view taken along line A-A' of FIG. 3A. Referring to FIGS. 3A and 3B, the liquid crystal display 10 is securely mounted on the second suction unit 130 by vacuum suction force, as shown in FIG. 3A. The liquid crystal panel 11 is configured to have a cross-sectional area smaller than that of the cover glass 12, and hence, the separation unit 140 is disposed on a side edge of the upper surface of the cover glass 12 by virtue of the difference between the two cross-sectional areas.

When the liquid crystal display 10 is heated by the second suction unit 130 and reaches a predetermined temperature, the second suction unit 130 rotates by a predetermined angle, thus separating the liquid crystal panel 11 from the cover glass 12 by means of wires 141a, 142 of the separation unit 140, as described in detail with reference to FIG. 3B.

As illustrated in FIG. 3A, a corner portion of the liquid crystal display 10 first contacts the separation unit 140 by the rotation of the second suction unit 130. As a result, the pressure applied to the resin material 13 disposed between the liquid crystal panel 11 and the cover glass 12 by the wire 141a is minimized, whereby breakage of the wire is prevented and the occurrence of defective liquid crystal panels 11 is reduced.

Figure 4A:
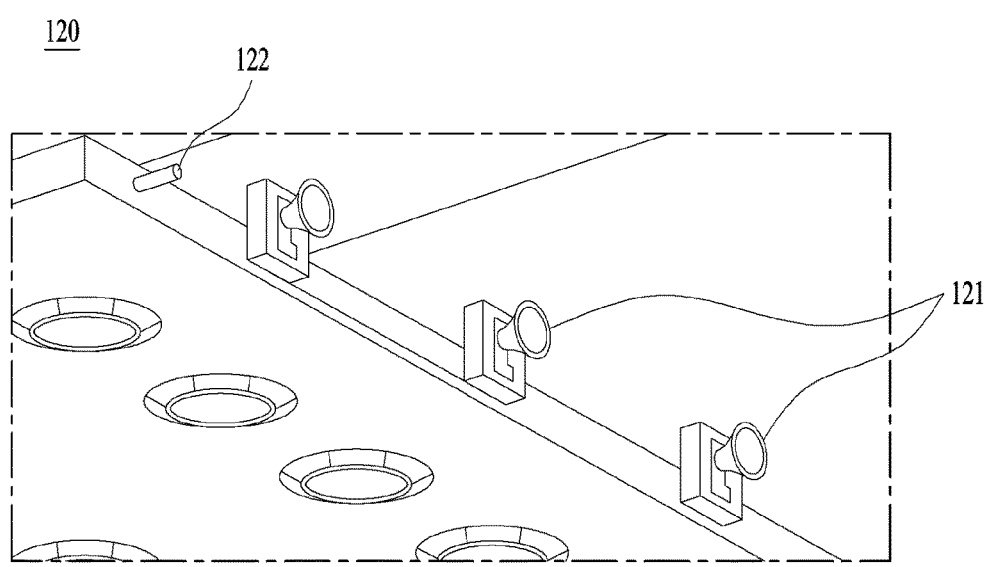
FIG. 4A is an enlarged perspective view showing a first suction unit of the liquid crystal display separator shown in FIG. 1, according to one embodiment.
Figure 4B:
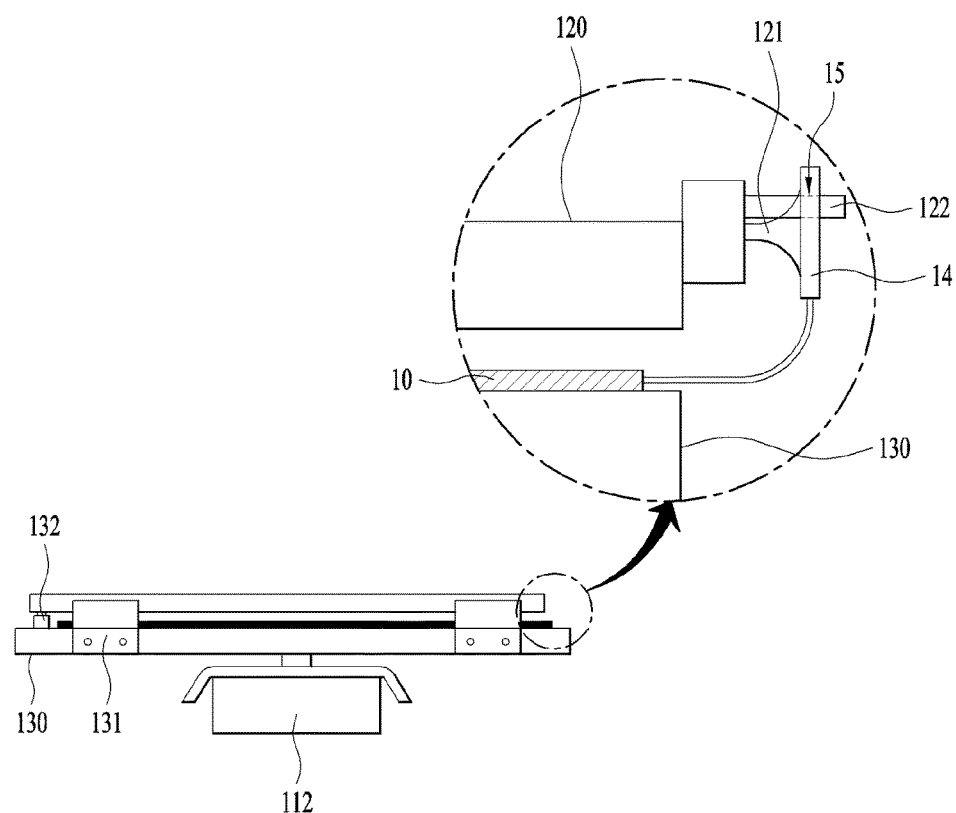
FIG. 4B is a schematic view showing the liquid crystal display sucked by both a first suction unit and a second suction unit, according to one embodiment.

FIG. 4A is an enlarged perspective view showing the first suction unit 120 of the liquid crystal display separator 100 shown in FIG. 1. FIG. 4B is a schematic view showing the liquid crystal display 10 sucked between the first suction unit 120 shown in FIG. 4A, and the second suction unit 130. Referring to FIGS. 4A and 4B, the first suction unit 120 is disposed so as to move horizontally and vertically by means of the first transfer unit 111. Specifically, the first suction unit 120 moves horizontally in conjunction with the second suction unit 130, and moves vertically to provide the force required to separate the liquid crystal panel 11 from the cover glass 12.

The first suction unit 120 includes a plurality of vacuum tubes 121, which are disposed close to the liquid crystal panel 11 and along the circuit board 14 to suck the circuit board at first surfaces thereof, and guide pins 122, which are provided between adjacent vacuum tubes 121 or at both lateral ends of respective vacuum tubes 121.

The plurality of vacuum tubes 121 are made of flexible rubber or synthetic resin material. The vacuum tubes closely contact the circuit board 14 and maintain a sealed state. The circuit board 14 is provided with one or more guide holes 15 formed therethrough. The circuit board 14 is bent perpendicularly to the upper or lower surface of the liquid crystal display, and is sucked and coupled to the vacuum tubes 121. Subsequently, the guide pins 122 are fitted in the guide holes 15, thus physically coupling the circuit board 14 to the vacuum tubes 121.

Accordingly, when the first suction unit 120 moves vertically, the circuit board 14 coupled by the guide pins 122 is raised or lowered along with the first suction unit 120. In addition, the attachment of the circuit board 14 to the vacuum tubes 121 enables increase in the force for raising or lowering the circuit board 14.

The first suction unit 120 is coupled to the first transfer unit 111 in an idling state, and is provided with only restoring force for restoring the first suction unit 120 to the rest position. Accordingly, since the first suction unit 120 is rotated by the rotation of the second suction unit 130, and is not provided with an additional rotational force, no direct physical force is applied to the liquid crystal panel 11. It is to be readily understood that the first suction unit 120 and the second suction unit 130 may alternatively be rotated in the same direction by the same force supplied from respective driving systems.

Figure 5:
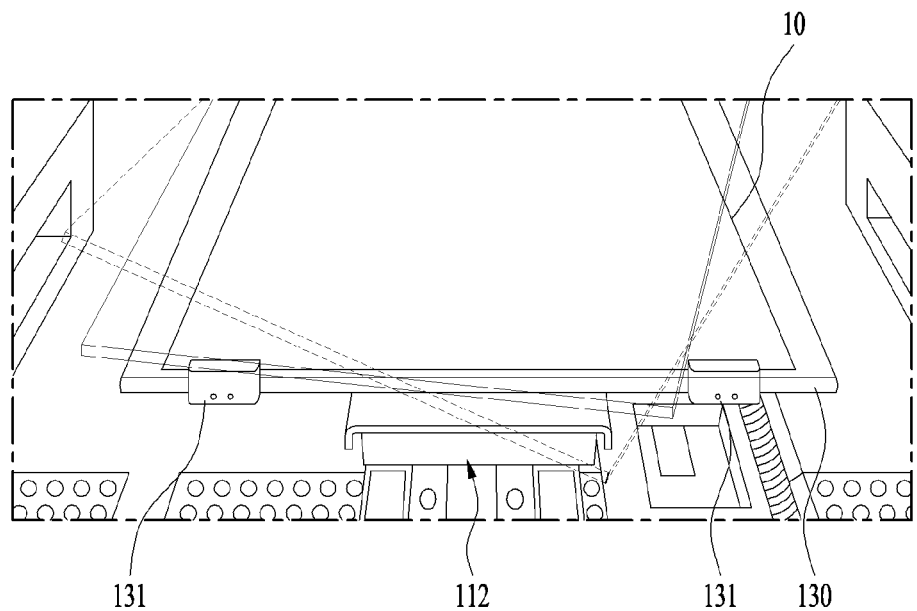
FIG. 5 is an enlarged perspective view showing the second suction unit of the liquid crystal display separator shown in FIG. 1.

FIG. 5 is an enlarged perspective view showing the second suction unit of the liquid crystal display separator shown in FIG. 1. Referring to FIG. 5, the second suction unit 130 serves to heat the cover glass 12 and attaches the upper surface of the cover glass 12 to itself by vacuum, and moves the liquid crystal display 10 horizontally. Furthermore, the second suction unit 130 provides the rotational force required to rotate over the second transfer unit 112.

The second suction unit 130 is provided at its one side edge with guide members 131 such that the second suction unit 130 moves in conjunction with the first suction unit 120 at the same rotational speed in the idle state. Alternatively, the guide members 131 may be provided at a side edge of the first suction unit 120 so as to interfere with the second suction unit 130.

The second suction unit 130 further includes wire guide members 132, to prevent first and second wires 141a, 142a of the separation unit 140 (which will be described later) from leaving the interior of the liquid crystal display through the edge where the wire guide members 132 are provided. The wire guide members 132 serve to prevent the first wire 141a from leaving the liquid crystal panel 11 and the cover glass 12 through the edge where the wire guide members 132 are provided. Therefore, there is no need to provide a structure or process for disposing the first wire 141a between the liquid crystal panel 11 and the cover glass 12 again.

Although not shown in the drawings, it will be understood that the second suction unit 130 is configured to move vertically in the direction equal to or opposite to the direction of vertical movement of the first suction unit 120.

The second suction unit 130 is set to have a heating temperature in a range of 70 to 100° C., and heats the resin material 13 disposed between the cover glass 12 and the liquid crystal panel 11 so as to maintain an appropriate temperature in accordance with the ambient temperature. Accordingly, the resin material 13 is melted into a gel state, and pressed by the separation unit 140, thus loosening the bonding force acting between the liquid crystal panel 11 and the cover glass 12.

As the second suction unit 130 moves toward the separation unit 140 in conjunction with the first suction unit 120, the separation procedure of the liquid crystal display 10 is performed. Furthermore, as the second suction unit 130 is returned to the normal position in conjunction with the first suction unit 120, the separation procedure of the liquid crystal display 10 is performed once more.

Figure 6:
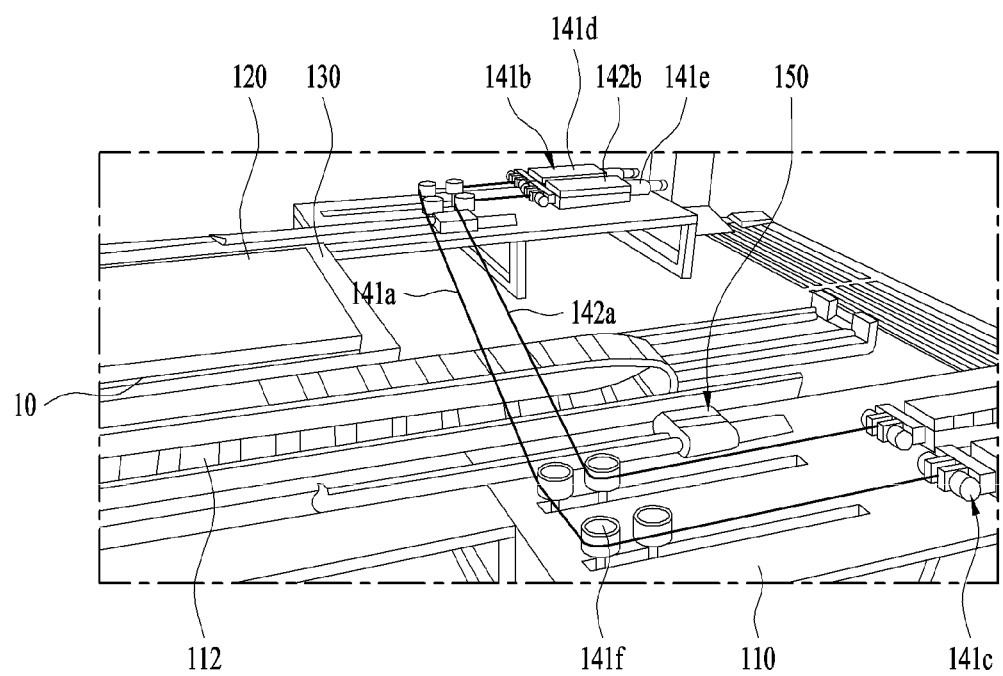
FIG. 6 is an enlarged perspective view showing the separation unit of the liquid crystal display separator shown in FIG. 1.

FIG. 6 is a perspective view showing the separation unit of the liquid crystal display separator shown in FIG. 1. Referring to FIG. 6, the separation unit 140 includes a first wire 141a which first contacts the liquid crystal display 10, first tensioners 141b provided at respective opposite ends of the first wire 141a, a second wire 142a which secondly contacts the liquid crystal display 10, and second tensioners 142b provided at respective opposite ends of the second wire 142a.

Although the separation procedure of the liquid crystal display 10 may be performed only by the first wire 141a and the first tensioners 141b, the separation unit 140 is, by way of example, illustrated as having a pair of wires and two pairs of tensioners because the separation procedure of the liquid crystal display 10 can be more efficiently fulfilled by the provision of the second wire 142 and the second tensioners 142b.

The first wire 141a and the second wire 142a are made of a metal material. The first wire 141a is configured to have a diameter equal to or smaller than the thickness of the resin material 13, and the second wire 142a is configured to have a diameter equal to or smaller than the thickness of the first wire 141a.

For example, the first wire 141a preferably has a diameter in a range of 200 to 250 µm, and the second wire 142a preferably has a diameter in a range of 150 to 200 µm. Accordingly, after the first wire 141a is first inserted between the liquid crystal panel 11 and the cover glass 12 while pressing the resin material 13, the second wire 142a is inserted between the liquid crystal panel 11 and the cover glass 12 after a predetermined time interval so as to prevent the liquid crystal panel 11 and the cover glass 12 from being bonded again to each other due to the adherence or curing of the resin material 13. In addition, since the wires also interfere with the resin material 13 to separate the liquid crystal display 10 when the first suction unit 120 and the second suction unit 130 move rearward after the forward movement thereof, the second wire 142a may prevent re-bonding of the liquid crystal panel 11 and the cover glass 12, in addition to re-bonding during the forward movement.

Since the second tensioners 142b are the same as the first tensioners 141b in construction and operation, only the first tensioners 141b will be described in detail by way of example.

Each of the first tensioners 141b include a holding member 141c for holding one end of the first wire 141a, a securing member 141d for securing the holding member 141c to the body unit 110, a damper 141e disposed between the holding member 141c and the securing member 141d to support the holding member 141c such that the holding member 141c elastically moves on the securing member 141d, and roller members 141f positioned at both ends of the first wire 141a to change the direction of tension of the first wire 141a.

The holding member 141c is configured to have a roll shape, around which one end of the first wire 141a is wound.

The damper 141e, which may be embodied as a cylinder using hydraulic or pneumatic pressure, decreases the tensile force of the first wire 141a when resistive force increases due to contact between the first wire 141a and the resin material 13, and returns to the normal position to maintain a predetermined tensile force when the resistive force decreases. Accordingly, since the tensile force of the first wire 141a is flexibly controlled in accordance with the resistive force of the resin material 13, it is possible to prevent easy breakage or deformation of the first wire 141a.

The securing member 141d secured to the body unit 110 to support the damper 141e, may selectively control the installation interval or the installation direction of the securing member 141d. Accordingly, it becomes possible to control the interval or direction of the first tensioners 141b and the second tensioners 142b. Controlling the installation interval of the first tensioners 141b for holding both ends of the first wire 141a makes it possible to control the separation timing of the liquid crystal panel and the interval from the second tensioners 142b to be controlled. The installation direction of the securing member 141d is set such that one end of the first wire 141a is bent at the roller member 141f, and thus the tensile direction of the first wire 141a is controlled. Accordingly, it is also possible to control the tensile force of the first wire 141a by controlling the installation direction of the securing member 141d.

Figure 7:
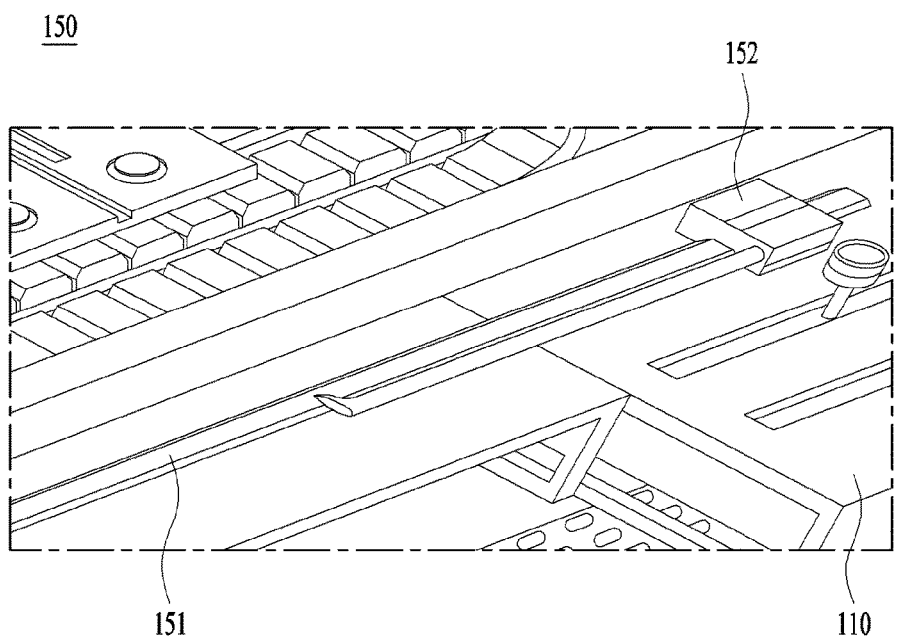
FIG. 7 is an enlarged perspective view showing a manual unit of the liquid crystal display separator shown in FIG. 1.

FIG. 7 is an enlarged perspective view showing a manual unit of the liquid crystal display separator shown in FIG. 1.

The manual unit 150 includes a linear motion (LM) guide 151, which is provided on the body unit 110 and horizontally and moves in the forward and rearward directions of the first and second suction units 120 and 130, and a cutting unit 152, which is provided on the LM guide 151 and reciprocates linearly.

Accordingly, when the separation unit 140 is broken or the operation thereof becomes impossible, it is possible to separate the liquid crystal display 10 by coupling a wire to the cutting unit 152. Furthermore, an automatic separation procedure may also be possible in such a way as to securely install the cutting unit 152 to the LM guide 151 and move the second suction unit 130 forward and rearward.

The manual unit 150 may perform a simple separation procedure when the liquid crystal panel 11 and the cover glass 12 are partially bonded to each other again, or are not completely separated even after the liquid crystal display 10 is separated by the separation unit 140. However, since the LM guide 151 reciprocates in a linear manner, the manual unit 150 preferably performs a simple manual separation procedure.

Hereinafter, the operating sequence and effects of the liquid crystal display separator 100 according to the present invention will be described in detail with reference to the accompanying drawings.

As shown in FIG. 1, a liquid crystal display 10 is first mounted on the second suction unit 130 such that the cover glass 12 is disposed at a lower position and the liquid crystal panel 11 is disposed above the cover glass 12.

Subsequently, the first suction unit 120 is lowered to the position of the second suction unit 130 by the first transfer unit 111, and a vacuum suction force is supplied to the first and second suction units 120, 130 to hold the cover glass 12 on the second suction unit 130. Then, the circuit board 14 is bent toward the lateral side surface of the lowered first suction unit 120, and is attached to the vacuum tubes 121 by vacuum sucking. At the same time, the guide pins 122 projecting from the lateral side surface of the first suction unit 120 are fitted into the guide holes 15 formed in the circuit board 14 to secure the circuit board 14. In this way, the mounting of the liquid crystal display is completed.

The second suction unit 130 heats the cover glass 12 to a predetermined temperature before or after the mounting of the liquid crystal display. When the cover glass 12 is completely heated to the predetermined temperature, the first and second suction units 120 and 130 move forward while moving upward by a predetermined height so as to cause the first wire 141a to be closely disposed on the cover glass 12.

Thereafter, as the first and second suction units 120, 130 rotate in a horizontal state, the first wire 141a begins to interfere with the resin material 13, thereby separating the liquid crystal display 10. After the first wire 141a is inserted between the liquid crystal panel 11 and the cover glass 12, the second wire 142a is subsequently inserted along the same path. As a result, the portion of the liquid crystal display 10 that has been separated by the first wire 141a is separated again by the second wire 142a so as to prevent re-bonding of the separated portion.

When the forward movement of the first and second suction units 120 and 130 is completed, the first wire 141a is blocked by the wire guide member 132, so that the first wire 141a remains between the liquid crystal panel 11 and the cover glass 12 together with the second wire 142a, without being completely separated from the liquid crystal display 10.

Thereafter, the first and second suction units 120, 130 move rearward and are returned to the normal position. At this time, the first and second suction units 120, 130 may be returned with or without the execution of continual rotation in a horizontal state, depending on the separated state of the liquid crystal display 10.

During the separation procedure, the first suction unit 120 is raised in a stepwise fashion at predetermined distances so as to space the liquid crystal panel 11 apart from the cover glass 12.

After the procedure of returning the first and second suction units 120 and 130 is completed and the cover glass 12 and the liquid crystal panel 11 are thus separated from each other, the first suction unit 120 is raised by a predetermined height, thus releasing the application of the vacuum suction force.

Subsequently, the circuit board 14 is separated from the guide pins 122 and the liquid crystal panel 11. The separated liquid crystal panel may be taken out.

If the liquid crystal display 10 is not completely separated, the separation procedure may further be executed by the first and second suction units 120, 130.

Referring back to FIG. 1, the controller 160 controls the operation of the body unit 110, the first suction unit 120, the second suction unit 130 and the separation unit 140. As specifically disclosed in the above description of the operation sequence of the liquid crystal display separator 100, since external force applied to the liquid crystal panel 11 is released only after the first wire 141a comes into close contact with the upper surface of the cover glass 12, the upper surface of the cover glass 12 is preferably controlled to be positioned at a level a predetermined height higher than the installation level of the first wire 141a at all times during the separation procedure.

Furthermore, the controller 160 preferably controls a corner portion of the liquid crystal display to first come into contact with the first wire 141a while the second suction unit 130 rotates, and preferably controls the second suction unit 130 to move forward or rotate at predetermined intervals when a tensile force beyond a predetermined range is applied to the first wire 141a.

In addition, the controller 160 controls the transfer speed of the first and second transfer units 111 and 112, vacuum suction force of first and second suction units 120 and 130, and the heating temperature of the second suction unit 130. Furthermore, the controller 160 also functions to monitor whether the first wire 141a or the second wire 142a is cut. When either of the wire is cut, the controller 160 stops the separation procedure and informs a worker of cutting of the wire.

Accordingly, the liquid crystal display separator 100 according to the present invention enables liquid crystal panels 11 having a uniform quality to be recovered from the liquid crystal displays 10 by an automated operation rather than a manual operation. In addition, by concurrent use of the first and second wires 141a and 142a, it is possible to prevent the liquid crystal panel 11 and the cover glass 12, which have been separated, from being bonded again to each other. Furthermore, since the tensile forces of the wires can be adjusted by the separation unit 140, it is possible to extend the service life of the wires. Also, a structure for supporting or applying external force onto the liquid crystal panel 11 is avoided. Therefore, it is possible to decrease defects, such as the occurrence of blots, on products.

By the liquid crystal display separator according to the present invention, at least the following advantages can be obtained: (i) defective parts can be reduced due to the use of automated equipment, (ii) liquid crystal panels of high quality can be separated and reused across different sizes, (iii) the tensile force of the wires can be adjusted to be within a predetermined range, and thus the maintenance interval of the separation unit can be extended, (iv) it is possible to prevent a separated liquid crystal panel and a cover glass from bonding again due to the use of a plurality of wires, and (v) since there is no structure for directly supporting the upper or lower surface of a liquid crystal panel, it is easy to maintain cell gaps and it is possible to prevent the occurrence of blots.

As described above, although reference to the embodiments has allowed the present invention to be described in more detail, it should be understood that the present invention is not limited to the embodiments but may be variously changed without departing from the technical idea of the present invention. Therefore, the embodiments disclosed in the present invention are not restrictive but are illustrative, and the scope of the technical idea of the present invention is not limited to the embodiments. The scope of the present invention should be interpreted by the accompanying claims, and it is to be understood that all technical ideas within the claims fall within the purview of the present invention.

What is claimed is:

1. A liquid crystal display separator comprising:
   a first transfer unit configured to move along a first plane;
   a second transfer unit configured to move along a second plane parallel to the first plane and in a direction perpendicular to the first plane;
   a first suction unit connected to the first transfer unit and configured to attach to a circuit board of a liquid crystal panel of a liquid crystal display;
   a second suction unit connected to the second transfer unit and configured to attach to a cover glass of the liquid crystal display; and
   a separation unit configured to separate the liquid crystal panel from the cover glass by passing at least a first wire between the liquid crystal panel and the cover glass responsive to the first transfer unit moving along the first plane and the second transfer unit moves along the second plane.

2. The liquid crystal display separator according to claim 1, wherein the first suction unit comprises:
   a plurality of vacuum tubes at a side of the suction unit and configured to attach to the circuit board; and
   at least one guide pin projecting from side surface of the first suction unit and configured to insert into at least one guide hole formed in the circuit board.

3. The liquid crystal display separator according to claim 1, wherein the separation unit comprises first tensioners, each of the first tensioners attached to at an end of the first wire to control tensile force in the first wire.

4. The liquid crystal display separator according to claim 3, wherein the separation unit further comprises:
   a second wire extending across a path of the liquid crystal display moving in the liquid crystal display, the second wire spaced apart from the first wire and located for insertion between the liquid crystal panel and the cover glass of the liquid crystal display; and
   second tensioners, each of the second tensioners attached to an end of the second wire to control tensile force of the second wire.

5. The liquid crystal display separator according to claim 4, wherein the first wire has a first diameter and the second wire has a second diameter smaller than the first diameter.

6. The liquid crystal display separator according to claim 4, wherein one of the first suction unit and the second suction unit includes a wire guide member at an edge to prevent the first and second wires from leaving the interior of the liquid crystal display through the edge.

7. The liquid crystal display separator according to claim 3, wherein the second suction unit includes a guide member provided at a side to synchronize rotation of the second suction unit with rotation of the first suction unit.

8. The liquid crystal display separator according to claim 4, further comprising: a controller configured to control operation of the first and second transfer units and the first and second suction units.

9. The liquid crystal display separator according to claim 8, wherein the controller is configured to control the second suction unit to rotate in a third plane between the first plane and the second plane by a predetermined angle to cause the first wire to enter between the liquid crystal panel and the cover glass display at an edge of the liquid crystal display.

10. The liquid crystal display separator according to claim 8, wherein the controller controls the second suction unit to be raised by a predetermined height to cause the first wire to come into contact with an upper surface of the cover glass when the first wire is positioned over the cover glass.

11. The liquid crystal display separator according to claim 1, further comprising: manual units disposed at both sides for connecting to a wire, the manual units movable manually to separate the liquid crystal panel from the cover glass.

12. The liquid crystal display separator according to claim 1, wherein the second suction unit comprises a heater to heat the liquid crystal display mounted on the second suction unit.

13. The liquid crystal display separator according to claim 1, wherein the circuit board is attached to the first suction unit by vacuum suction, and the cover glass is attached to the second suction unit by vacuum suction.

14. The liquid crystal display separator according to claim 1, wherein the first plane is a horizontal plane.

\* \* \* \* \*